(12) United States Patent
Tan et al.

(10) Patent No.: US 11,330,695 B2
(45) Date of Patent: May 10, 2022

(54) ARRAYED X-RAY SOURCE AND X-RAY IMAGING APPARATUS

(71) Applicants: Tsinghua University, Beijing (CN); Nuctech Company Limited, Beijing (CN)

(72) Inventors: Chengjun Tan, Beijing (CN); Wenhui Huang, Beijing (CN); Qingxiu Jin, Beijing (CN); Chuanxiang Tang, Beijing (CN); Donghai Liu, Beijing (CN); Qun Luo, Beijing (CN); Peidong Wu, Beijing (CN); Cheng Song, Beijing (CN); Yunze Ding, Beijing (CN); Cong Xu, Beijing (CN); Luming Zhang, Beijing (CN); Shuo Wang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 16/931,261

(22) Filed: Jul. 16, 2020

(65) Prior Publication Data
US 2021/0084739 A1 Mar. 18, 2021

(30) Foreign Application Priority Data
Sep. 16, 2019 (CN) .......................... 201910874455.9

(51) Int. Cl.
*H05G 1/04* (2006.01)
*H01J 35/18* (2006.01)
*H05G 1/02* (2006.01)
*G01N 23/04* (2018.01)
*H01J 35/14* (2006.01)

(52) U.S. Cl.
CPC ............... *H05G 1/04* (2013.01); *H01J 35/18* (2013.01); *G01N 23/04* (2013.01); *G01N 2223/40* (2013.01); *H01J 35/147* (2019.05); *H05G 1/025* (2013.01)

(58) Field of Classification Search
CPC ........ H01J 35/147; H01J 35/18; H05G 1/025; H05G 1/04
See application file for complete search history.

(56) References Cited

U.S. PATENT DOCUMENTS

| 2,258,141 | A | * | 10/1941 | Magnusson | H05G 1/04 378/200 |
|---|---|---|---|---|---|
| 4,184,097 | A | * | 1/1980 | Auge | H01J 35/16 378/140 |
| 7,233,644 | B1 | * | 6/2007 | Bendahan | G01N 23/046 378/57 |
| 2015/0003590 | A1 | * | 1/2015 | Koh | H01J 35/112 378/62 |
| 2016/0262710 | A1 | * | 9/2016 | Baek | A61B 6/4007 |
| 2019/0341220 | A1 | * | 11/2019 | Parker | H01J 35/112 |
| 2020/0100749 | A1 | * | 4/2020 | Makino | A61B 6/502 |

* cited by examiner

*Primary Examiner* — Chih-Cheng Kao
(74) *Attorney, Agent, or Firm* — Knobbe, Martens, Olson & Bear, LLP

(57) ABSTRACT

An arrayed X-ray source and an X-ray imaging apparatus are described. An example X-ray source includes a housing and X-ray generators located in the housing. The X-ray generators are arranged in an array. The X-ray generators are provided separately from each other and configured to emit X-rays independently of each other.

15 Claims, 3 Drawing Sheets

ARRAYED X-RAY SOURCE AND X-RAY IMAGING APPARATUS

CROSS-REFERENCE TO RELATED APPLICATION

This application claims priority to Chinese Patent Application No. 201910874455.9 filed on Sep. 16, 2019, the disclosure of which is hereby incorporated herein by reference in its entirety.

TECHNICAL FIELD

The disclosed technology generally relates to the field of X-ray inspection, and particularly to an arrayed X-ray source and an X-ray imaging apparatus.

BACKGROUND

X-rays are widely used in the fields of industrial nondestructive inspection, safety inspection, medical diagnosis and treatment, and the like. A device for generating X-rays may be called an X-ray source or an X-ray generator, which includes a cathode and an anode. The cathode produces an electron beam current, which is accelerated by a high voltage electric field between the cathode and the anode and impacts an anode target point to generate X-rays.

In a distributed X-ray source, cathodes are arranged as electron emission units in an array. A voltage of a control grid is used to control emission of electrons, thereby controlling each cathode to emit electrons in sequence to bombard the target point in the corresponding sequence on the anode, so as to generate X-rays. In order to improve imaging quality of a distributed X-ray imaging apparatus, dozens or even hundreds of X-ray sources are usually required, which means that a large number of cathodes, anodes, control grids and other devices are needed. If these devices are installed in the same vacuum chamber, it is difficult for replacement and maintenance when one or more of the sources fail.

SUMMARY

In order to overcome at least one of the above and other problems and defects existing in the prior art, the disclosed technology is proposed.

According to an aspect of the disclosed technology, there is provided an arrayed X-ray source, comprising a housing and a plurality of X-ray generators located in the housing, the plurality of X-ray generators being arranged in an array, the plurality of X-ray generators being provided separately from each other and configured to emit X-rays independently of each other.

In some embodiments, each of the plurality of X-ray generators comprises: an anode target configured to generate X-rays under an impact of an electron beam; and an X-ray extraction window, the X-ray extraction window being provided on the anode target such that at least a portion of the X-rays generated by the anode target is emitted from the X-ray extraction window.

In some embodiments, X-ray extraction windows of the plurality of X-ray generators are all oriented toward a first direction.

In some embodiments, the plurality of X-ray generators are arranged linearly in the housing in a second direction, with their anode targets being located on a same side.

In some embodiments, the plurality of X-ray generators at least comprise a first row of X-ray generators and a second row of X-ray generators arranged side by side, the first row of X-ray generators and the second row of X-ray generators being offset from each other in the second direction.

In some embodiments, the plurality of X-ray generators at least comprise a first row of X-ray generators and a second row of X-ray generators arranged side by side, with anode targets of the first row of X-ray generators and the second row of X-ray generators facing each other.

In some embodiments, each of the plurality of X-ray generators further comprises: a tubular casing with a closed first end and an opposite open second end, the anode target being provided at the second end to define a vacuum space together with the tubular casing; and an electron beam generating device provided close to the first end in the tubular casing and configured to emit an electron beam toward the anode target.

In some embodiments, each of the plurality of X-ray generators further comprises: a control grid provided in the vacuum space adjacent to the electron beam generating device and configured to control emission and cutoff of the electron beam from the electron beam generating device; and/or a focusing device provided in the vacuum space for collecting and focusing the electron beam from the electron beam generating device such that the focused electron beam passes through the vacuum space to impact onto the anode target.

In some embodiments, the anode target is provided with an opening in communication with the vacuum space such that at least a portion of the electron beam impacts the anode target via the opening, and the X-ray extraction window closes the opening such that at least a portion of the X-rays generated by the anode target is emitted from the X-ray extraction window via the opening.

In some embodiments, at least one of the plurality of X-ray generators is a single-focus X-ray generator.

In some embodiments, at least one of the plurality of X-ray generators is a pulse X-ray generator.

In some embodiments, the arrayed X-ray source further comprises insulating oil in the housing, with the plurality of X-ray generators being at least partially immersed in the insulating oil.

In some embodiments, the housing is made of metal, ceramic or glass; and/or the X-ray extraction window is made of a metallic foil selected from a group consisting of a titanium foil, a copper foil, an aluminum foil, a beryllium foil, and a stainless steel coil, or made of a ceramic sheet or a glass sheet.

According to another aspect of the disclosed technology, there is provided an X-ray imaging apparatus, comprising an arrayed X-ray source described in any embodiment of the disclosed technology.

The other objects and advantages of the disclosed technology will be more apparent through the following detailed description of the disclosed technology with reference to the drawings, which may also help comprehensively understand the disclosed technology.

BRIEF DESCRIPTION OF THE DRAWINGS

The features and advantages of the disclosed technology will be understood more clearly with reference to the drawings. The drawings are merely schematic and should not be construed as limiting the disclosed technology. In the drawings.

DETAILED DESCRIPTION

The technical solutions in the embodiments of the disclosed technology will be clearly and completely described below with reference to the drawings in the embodiments of the disclosed technology. As may be appreciated, the described embodiments are only some of the embodiments of the disclosed technology. Other embodiments obtained by those of ordinary skill in the art may fall within the scope of the present disclosure.

In addition, in the following detailed description, for the ease of explanation, many specific details are described to provide an understanding of embodiments of the disclosed technology. It may be appreciated that one or more embodiments may also be implemented without these specific details. In other cases, well-known structures and devices may be shown in diagrams to simplify the drawings.

Figure 1:
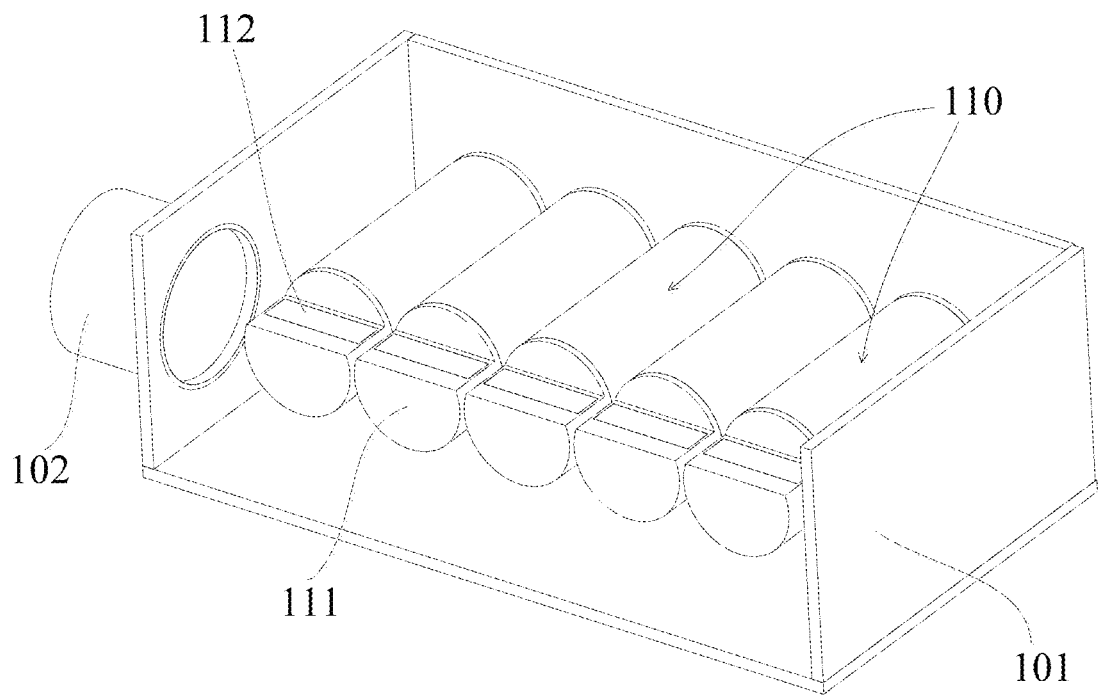
FIG. 1 is a schematic perspective view showing an arrangement of an arrayed X-ray source according to an exemplary embodiment of the disclosed technology.
Figure 2:
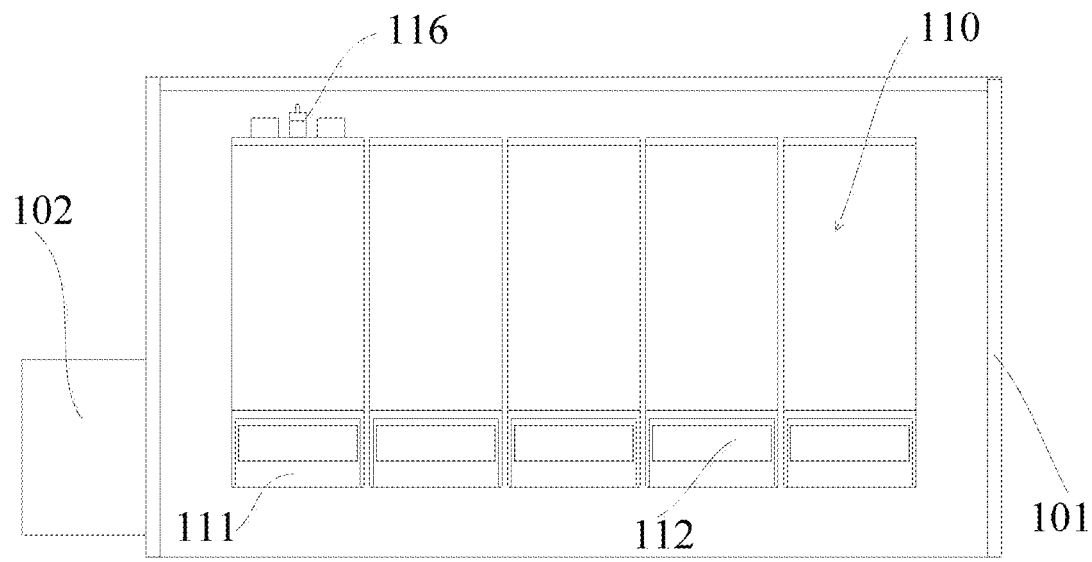
FIG. 2 is a schematic top view showing an arrangement of an arrayed X-ray source according to an exemplary embodiment of the disclosed technology.
Figure 3:
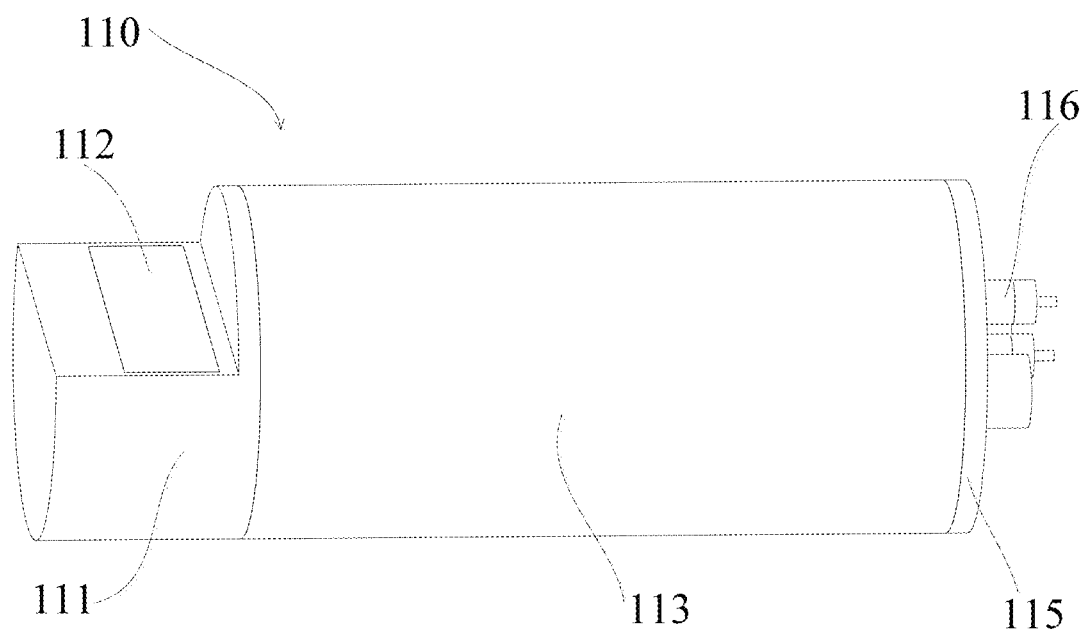
FIG. 3 is a perspective view showing a structure of a single-focus X-ray generator in an arrayed X-ray source according to an exemplary embodiment of the disclosed technology.

FIG. 1 schematically shows an arrangement of an arrayed X-ray source according to an exemplary embodiment of the disclosed technology. As shown, an exemplary arrayed X-ray source 100 is a distributed X-ray source that mainly comprises a housing 101 and a plurality of X-ray generators 110 located within the housing 101. The housing may be made of metal, ceramic or glass. According to an embodiment of the disclosed technology, the plurality of X-ray generators are arranged in an array in the housing 101, respective X-ray generators are provided separately from each other and configured to emit X-rays independently of each other. Illustratively, each of the X-ray generators 110 in the housing 101 may be individually supplied with an operating voltage through a connector interface 102. For example, by controlling each of the X-ray generators to operate in turn, it is possible to achieve a rapid scanning of an object under inspection. Therefore, with the X-ray source having such an arrangement, the X-ray generators are independent of each other, which facilitates disassembly, installation, maintenance, and reduces equipment costs. For example, if one of the X-ray generators is abnormal or failed (e.g., damaged), it may be replaced directly with a new X-ray generator, thus reducing maintenance costs and difficulties.

In some embodiments, the arrayed X-ray source 100 further comprises insulating oil or cooling liquid in the housing 101, with the plurality of X-ray generators 110 being at least partially immersed in the insulating oil or cooling liquid. Thereby on the one hand, high-voltage insulation can be achieved; on the other hand, the heat generated by the X-ray generators can be taken away through fluid circulation.

In some embodiments, at least one of the X-ray generators is a single-focus X-ray generator, which is configured as a single device capable of emitting X-rays independently. The X-ray generator is, for example, a pulsed X-ray generator. In other embodiments, the X-ray generators themselves may also be multi-focus or distributed X-ray generating devices, each forming an independent X-ray sub-source.

As shown in FIGS. 1-5, the X-ray generator 110 comprises an anode target 111 and an X-ray extraction window 112 provided on the anode target 111. The anode target 111 generates X-rays under the impact of particles such as an electron beam, and may also take away excess heat, and at least a portion of the generated X-rays is emitted from the X-ray extraction window 112. The X-ray generator 110 has a tubular casing 113 with opposed first end (a right end shown in the figures) and second end (a left end shown in the figures). The first end is closed, for example, by a seal plate 115. The seal plate 115 may be formed integrally with the tubular casing 113, or separately formed and hermetically mounted to the first end of the tubular casing 113. As shown, the anode target 111 is provided at the second end of the tubular casing 113, thereby defining a vacuum space V in the tubular casing, so that particles such as electron beams travel in the vacuum space V toward the anode target 111. In other embodiments, the entire anode target may be provided in the casing, for example, sealed in the vacuum space V, and the generated X-rays may be emitted through the casing.

In some embodiments, the X-ray generator 110 further comprises an electron beam generating device 114 configured to emit an electron beam toward the anode target 112. For example, the electron beam generating device 114 is provided in the tubular casing 113 at a position close to the first end of the tubular casing 113, and emits an electron beam under the control of a voltage. The electron beam passes through the vacuum space V and impacts the anode target 111, so that the anode target 111 generates X-rays. At the first end of the tubular casing 113, for example, on the seal plate 115, a connector 116 is hermetically provided, via which an external power supply supplies a negative high voltage to the electron beam generating device 114.

In some embodiments, the anode target may be made of at least one of tungsten, copper, silver and palladium. The X-ray extraction window may be made of metallic foil such as titanium foil, copper foil, aluminum foil, beryllium foil, stainless steel coil, and the like, or made of a nonmetallic material such as a ceramic sheet, a glass sheet, and the like. The X-ray extraction window may be hermetically provided on the anode target in various ways, such as welding, brazing, crimping, sintering, or by suitable connecting pieces or fixing pieces, etc.

Illustratively, the X-ray generator may be an X-ray tube or an accelerator. When the X-ray generator is an X-ray tube, the electron beam generating device is a cathode; when the X-ray source is an accelerator, the electron beam generating device comprises an electron gun and an accelerating tube. In this case, the X-ray generator may also comprise a microwave power source, a waveguide and other components. An X-ray tube is illustrated below by way of example.

In the illustrated embodiments, the X-ray generator 110 further comprises a control grid 117 and/or a focusing device 118. The control grid 117 may also be referred to as a control gate, which is provided in the vacuum space V defined in the casing 113, and located adjacent to the electron beam generating device 114, for example, located at an electron exit of the electron beam generating device 114, for controlling emission and cutoff of the electron beam of the electron beam generating device 114. For example, when a suitable voltage (for example, a negative voltage whose absolute value may be greater than the absolute value of the voltage on the electron beam generating device) is applied on the control grid (that is, the voltage applied on the control grid is negative relative to the voltage on the electron beam generating device), no electron is emitted to the anode target, thus the X-ray generator does not generate X-rays; when the voltage applied on the control grid is positive relative to the voltage on the electron beam generating device, the electrons emitted by the electron beam generating device are extracted by the control gird and impact the anode target to generate X-rays. By adjusting the voltage on the control grid, the electron amount of the electron beam emitted by the electron beam generating device may be adjusted, thereby adjusting the output of X-rays. The focusing device 118 is provided in the vacuum space V defined in the casing 113, for example, located downstream of the control gird 117, for collecting and focusing the electron beam from the electron beam generating device 114. The focused electron beam passes through the vacuum space V and impacts on the anode target 111 under the action of the electric field.

Figure 4:
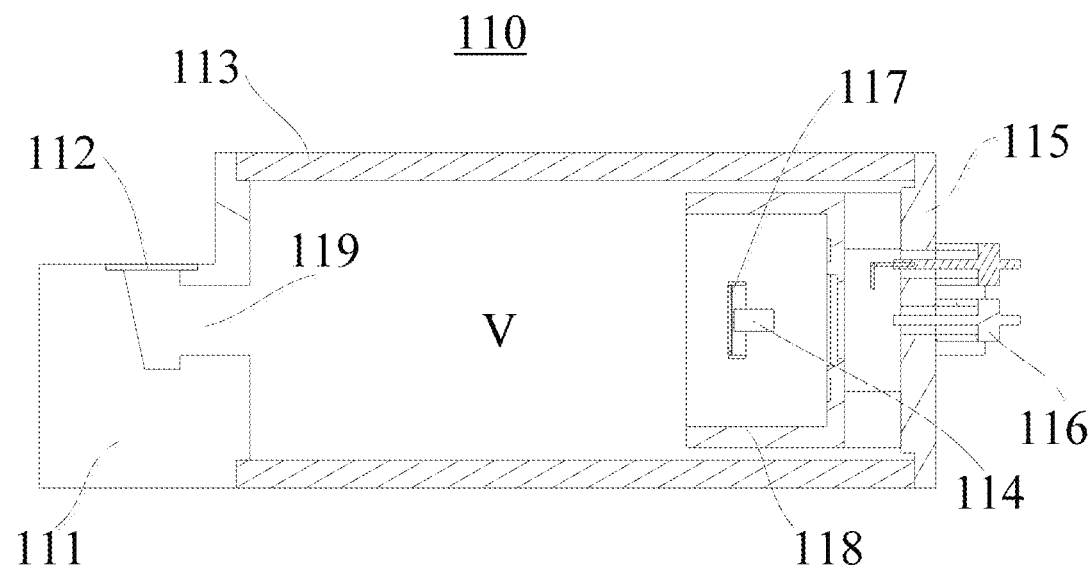
FIG. 4 is a sectional view showing a structure of a single-focus X-ray generator in an arrayed X-ray source according to an exemplary embodiment of the disclosed technology.
Figure 5:
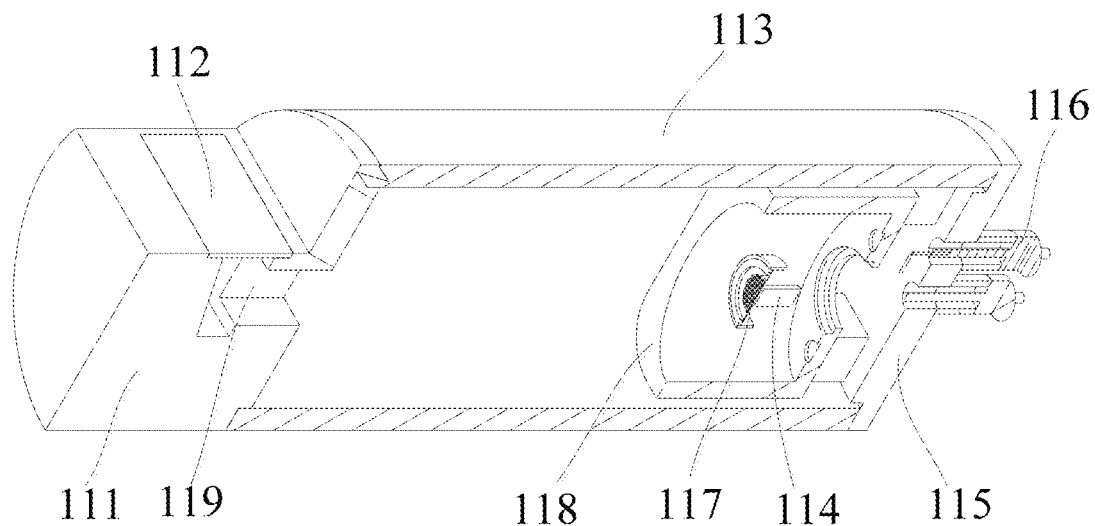
FIG. 5 is a perspective sectional view showing a structure of a single-focus X-ray generator in an arrayed X-ray source according to an exemplary embodiment of the disclosed technology.

In some embodiments of the disclosed technology, as shown in FIGS. 4 and 5, the anode target is provided with an opening 119 in communication with the vacuum space V defined in the casing 113. At least a portion of the electron beam impacts a target point on the anode target 111 via the opening 119, while the X-ray extraction window 112 closes the opening 119, so that at least a portion of the X-rays generated by the anode target 111 is emitted from the X-ray extraction window 112 via the opening 119. Illustratively, the opening 119 is axially aligned with the electron beam generating device 114 (for example, also with the control grid 117 and/or the focusing device 118), so that most of the electron beam generated by the electron beam generating device 114 impacts the interior of the anode target 111 via the opening 119, facilitating emission of the X-rays generated by the anode target 111 from the X-ray extraction window 112.

Figure 6:
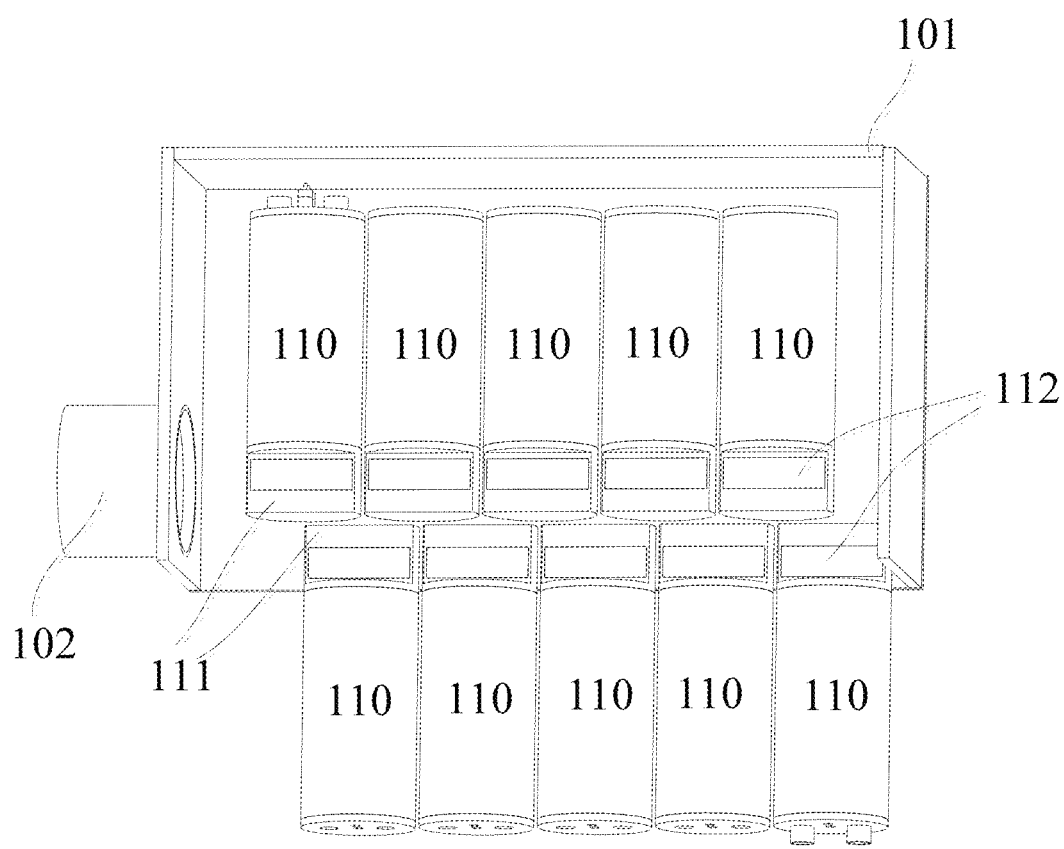
FIG. 6 is a perspective top view showing an arrangement of an arrayed X-ray source according to another exemplary embodiment of the disclosed technology.

In some embodiments, as shown in FIGS. 1 and 6, X-ray extraction windows 112 of a plurality of X-ray generators 110 are oriented substantially toward the same direction (a first direction). Illustratively, in FIG. 1, the plurality of X-ray generators 110 are arranged linearly in the housing 101 in a second direction (also referred to as an arrangement direction), with anode targets 111 on a same side. For example, the arrangement direction of the plurality of X-ray generators 110 is substantially perpendicular to an extension direction or axial direction of a single X-ray generator, and the individual X-ray generators 110 are spaced apart at a fixed or varying interval, so that the corresponding anode targets 111 are insulated from each other, thus the emitted X-rays do not interfere with each other.

In the embodiment shown in FIG. 6, the arrayed X-ray source at least comprises a first row of X-ray generators and a second row of X-ray generators, which are arranged side by side in a third direction (an up-down direction shown in the figure) and insulated from each other. Each row of the X-ray generators may be, for example, a linear array. In some examples, the first and second rows of X-ray generators are staggered or offset from each other in their arrangement direction (a left-right direction shown in the figure, that is, the second direction). For example, an X-ray generator in the first row of X-ray generators has a central axis between central axes of two adjacent X-ray generators in the second row of X-ray generators, so as to improve a spatial density of the X-ray source. As shown, the anode targets of the first row of X-ray generators and the second row of X-ray generators may face each other, which improves the spatial density of the X-ray source; further, the anode targets of the first row of X-ray generators and the second row of X-ray generators may be offset from each other in the arrangement direction (the left-right direction shown in the figure), for example, positions or target points impacted by the electron beams on the anode targets of the first row of X-ray generators are not aligned with positions or target points impacted by the electron beams on the anode targets of the second row of X-ray generators, for example, they are not in alignment with each other in the extension direction or axial direction of the X-ray generators, thereby achieving a staggered arrangement and impact structure. In some other examples, X-ray extractions of the first and second rows of the X-ray generators may also be staggered or offset from each other in the arrangement direction (the left-right direction shown in the figure).

The above first row of X-ray generators and second row of X-ray generators may be located in the same housing. Or alternatively, the first row of X-ray generators and the second row of X-ray generators may be located in different sub-housings arranged side by side.

Embodiments of the disclosed technology further provide an X-ray imaging apparatus, which comprises the above-described X-ray source, and thus is easy to be disassembled, installed and maintained, and reduces equipment costs.

Although embodiments of the disclosed technology have been shown and described, it is understood by those of ordinary skill in the art that modifications may be made to these embodiments without departing from the principles and spirit of the disclosed technology. The scope of the disclosed technology is defined by the appended claims and their equivalents.

What is claimed is:

1. An arrayed X-ray source, comprising a housing and a plurality of X-ray generators located within the housing, the plurality of X-ray generators being arranged in an array, the plurality of X-ray generators being provided separately from each other and configured to emit X-rays independently of each other, wherein the plurality of X-ray generators at least comprise a first row of X-ray generators and a second row of X-ray generators arranged parallel in a column direction of the array, the first row of X-ray generators and the second row of X-ray generators are arranged linearly in a row direction of the array, and the first row of X-ray generators and the second row of X-ray generators are offset from each other in the row direction of the array, wherein each of the plurality of X-ray generators comprises:

an anode target configured to generate X-rays under an impact of an electron beam, and an X-ray extraction window, the X-ray extraction window being provided on the anode target such that at least a portion of the X-rays generated by the anode target is emitted from the X-ray extraction window, wherein X-ray extraction windows of the plurality of X-ray generators are all oriented toward a first direction, wherein the plurality of X-ray generators are arranged linearly in the housing in a second direction, with their anode targets being located on a same side, and wherein the anode targets of the first row of X-ray generators and the second row of X-ray generators are facing each other.

2. The arrayed X-ray source according to claim 1, wherein each of the plurality of X-ray generators further comprises:
   a tubular casing with a closed first end and an opposite open second end, the anode target being provided at the second end to define a vacuum space together with the tubular casing; and
   an electron beam generating device provided in the tubular casing at a position close to the first end and configured to emit an electron beam toward the anode target.

3. The arrayed X-ray source according to claim 2, wherein each of the plurality of X-ray generators further comprises:
   a control grid provided in the vacuum space adjacent to the electron beam generating device and configured to control emission and cutoff of the electron beam from the electron beam generating device; and/or
   a focusing device provided in the vacuum space, for collecting and focusing the electron beam from the electron beam generating device such that the focused electron beam passes through the vacuum space to impact onto the anode target.

4. The arrayed X-ray source according to claim 1, wherein the anode target is provided with an opening in communication with vacuum space, such that at least a portion of the electron beam impacts the anode target via the opening, and
   the X-ray extraction window closes the opening, such that at least a portion of the X-rays generated by the anode target is emitted from the X-ray extraction window via the opening.

5. The arrayed X-ray source according to claim 1, wherein at least one of the plurality of X-ray generators is a single-focus X-ray generator.

6. The arrayed X-ray source according to claim 1, wherein at least one of the plurality of X-ray generators is a pulsed X-ray generator.

7. The arrayed X-ray source according to claim 1, wherein,
   the housing is made of metal, ceramic or glass; and/or
   the X-ray extraction window is made of a metallic foil selected from a group consisting of a titanium foil, a copper foil, an aluminum foil, a beryllium foil, and a stainless steel coil, or made of a ceramic sheet or a glass sheet.

8. The arrayed X-ray source according to claim 1, further comprising insulating oil in the housing, with the plurality of X-ray generators being at least partially immersed in the insulating oil.

9. The arrayed X-ray source according to claim 2, further comprising insulating oil in the housing, with the plurality of X-ray generators being at least partially immersed in the insulating oil.

10. The arrayed X-ray source according to claim 3, further comprising insulating oil in the housing, with the plurality of X-ray generators being at least partially immersed in the insulating oil.

11. The arrayed X-ray source according to claim 4, further comprising insulating oil in the housing, with the plurality of X-ray generators being at least partially immersed in the insulating oil.

12. The arrayed X-ray source according to claim 5, further comprising insulating oil in the housing, with the plurality of X-ray generators being at least partially immersed in the insulating oil.

13. The arrayed X-ray source according to claim 6, further comprising insulating oil in the housing, with the plurality of X-ray generators being at least partially immersed in the insulating oil.

14. The arrayed X-ray source according to claim 7, further comprising insulating oil in the housing, with the plurality of X-ray generators being at least partially immersed in the insulating oil.

15. An X-ray imaging apparatus, comprising an arrayed X-ray source according to claim 1.

* * * * *